US012706816B2

(12) United States Patent
Sheoran et al.

(10) Patent No.: US 12,706,816 B2
(45) Date of Patent: Aug. 11, 2026

(54) MACHINE LEARNING-BASED CELLULAR SERVICE ISSUE TROUBLESHOOTING USING LIMITED GROUND TRUTH DATA

(71) Applicants: AT&T Intellectual Property I, L.P., Atlanta, GA (US); The Regents of the University of California, Santa Cruz, CA (US)

(72) Inventors: Amit Kumar Sheoran, Raritan, NJ (US); Xiaofeng Shi, Somerville, NJ (US); Jia Wang, Basking Ridge, NJ (US); Chen Qian, Scotts Valley, CA (US); Matthew Osinski, Westfield, NJ (US)

(73) Assignees: AT&T Intellectual Property I, L.P., Atlanta, GA (US); The Regents of the University of California, Santa Cruz, CA (US)

( * ) Notice: Subject to any disclaimer, the term of this patent is extended or adjusted under 35 U.S.C. 154(b) by 604 days.

(21) Appl. No.: 17/993,589

(22) Filed: Nov. 23, 2022

(65) Prior Publication Data

US 2024/0171480 A1 May 23, 2024

(51) Int. Cl.
*H04W 24/04* (2009.01)
*H04L 41/0631* (2022.01)
(Continued)

(52) U.S. Cl.
CPC ...... *H04L 41/5019* (2013.01); *H04L 41/0631* (2013.01); *H04L 41/0654* (2013.01);
(Continued)

(58) Field of Classification Search
CPC ............. H04L 41/5019; H04L 41/0631; H04L 41/0654; H04L 41/16; H04L 41/5067; H04W 24/04
See application file for complete search history.

(56) References Cited

U.S. PATENT DOCUMENTS 7,788,209 B2 * 8/2010 Paquet .................. G06N 5/045 706/52
9,787,484 B2 * 10/2017 Teittinen ............ H04L 41/0893
(Continued)

OTHER PUBLICATIONS

Shi, Xiaofeng, "Data-Driven Approaches and Systems for the Reliability of Mobile Network Services", University of California Santa Cruz; A dissertation submitted in partial satisfaction of the requirements for the degree of Doctor of Philosophy in Computer Engineering, Jun. 2022, 185 pages.
(Continued)

*Primary Examiner* — Steven S Kelley
(74) *Attorney, Agent, or Firm* — Guntin & Gust, PLC; Colin LaRose

(57) ABSTRACT

Aspects of the subject disclosure may include, for example, training a first machine learning model based on a combination of labeled training data and unlabeled training data, the first machine learning model producing augmented training data, training a second machine learning model based on a combination of the labeled training data and the augmented training data, receiving, at a client device, customer information about a service degradation at a user equipment (UE) device of a customer in a cellular network, providing the customer information to the second machine learning model, receiving, at the client device, from the second machine learning model, information identifying a root cause of the service degradation, and modifying a network component of the cellular network or the UE device, based on the information identifying a root cause of the service degradation. Other embodiments are disclosed.

20 Claims, 9 Drawing Sheets

(51) Int. Cl.

| | |
|---|---|
| ***H04L 41/0654*** | (2022.01) |
| ***H04L 41/16*** | (2022.01) |
| ***H04L 41/5019*** | (2022.01) |
| ***H04L 41/5067*** | (2022.01) |

(52) U.S. Cl.

CPC .......... *H04L 41/16* (2013.01); *H04L 41/5067* (2013.01); *H04W 24/04* (2013.01)

(56) References Cited

U.S. PATENT DOCUMENTS

| | | | | |
|---|---|---|---|---|
| 11,399,295 | B2 | 7/2022 | Osinski et al. | |
| 11,477,070 | B1* | 10/2022 | Pei | H04L 41/064 |
| 11,805,005 | B2* | 10/2023 | Dutta | H04L 41/342 |
| 11,956,117 | B1* | 4/2024 | Appachi Gounder | H04L 41/0627 |
| 2013/0238534 | A1* | 9/2013 | Nagaraj | H04L 41/0213 706/12 |
| 2015/0304191 | A1* | 10/2015 | Groenendijk | H04L 5/0092 370/252 |
| 2016/0241429 | A1* | 8/2016 | Froehlich | H04L 41/0631 |
| 2017/0140313 | A1* | 5/2017 | Nandi | G06Q 10/0637 |
| 2017/0235628 | A1* | 8/2017 | Nguyen | G06F 11/0751 714/37 |
| 2017/0353991 | A1* | 12/2017 | Tapia | H04L 43/08 |
| 2019/0281476 | A1* | 9/2019 | Lyon | G06N 3/09 |
| 2019/0306011 | A1* | 10/2019 | Fenoglio | H04L 41/142 |
| 2020/0204680 | A1* | 6/2020 | Prakash | G06N 20/00 |
| 2021/0273844 | A1* | 9/2021 | Xie | H04L 41/0654 |
| 2021/0303793 | A1* | 9/2021 | Wang | G06F 40/30 |
| 2021/0351989 | A1* | 11/2021 | Toy | H04L 47/83 |
| 2021/0385646 | A1* | 12/2021 | Liu | H04W 24/04 |
| 2022/0083840 | A1* | 3/2022 | Luong | G06N 20/00 |
| 2022/0148008 | A1* | 5/2022 | Pham | G06Q 30/016 |
| 2023/0011452 | A1* | 1/2023 | Barber | G06F 16/24558 |
| 2023/0188408 | A1* | 6/2023 | Pick | H04L 41/16 709/224 |
| 2023/0261930 | A1* | 8/2023 | Kumar | H04L 43/067 709/224 |
| 2023/0300039 | A1* | 9/2023 | Kersch | H04L 41/0631 709/224 |
| 2023/0370338 | A1* | 11/2023 | Shori | H04L 41/0661 |
| 2024/0114362 | A1* | 4/2024 | Wang | H04W 24/04 |
| 2024/0179045 | A1* | 5/2024 | Ma | H04L 41/0631 |

OTHER PUBLICATIONS

Shi, Xiaofeng et al., "ML-based Cellular Service Issue Troubleshooting Using Limited Ground Truth Data", 2022 IEEE International Symposium on Local and Metropolitan Networks (LANMAN), Jul. 11, 2022, 2 pages.

* cited by examiner

WIRELESS ACCESS 120
122
124
124
126
MEDIA ACCESS 140
144
144
MEDIA TERMINAL 142
COMMUNICATIONS NETWORK 125
NE 150
NE 152
NE 154
NE 156
SWITCHING DEVICE 132
134
134
VOICE ACCESS 130
CONTENT SOURCES 175
BROADBAND ACCESS 110
ACCESS TERMINAL 112
114
114
100

200

Figure 2B:
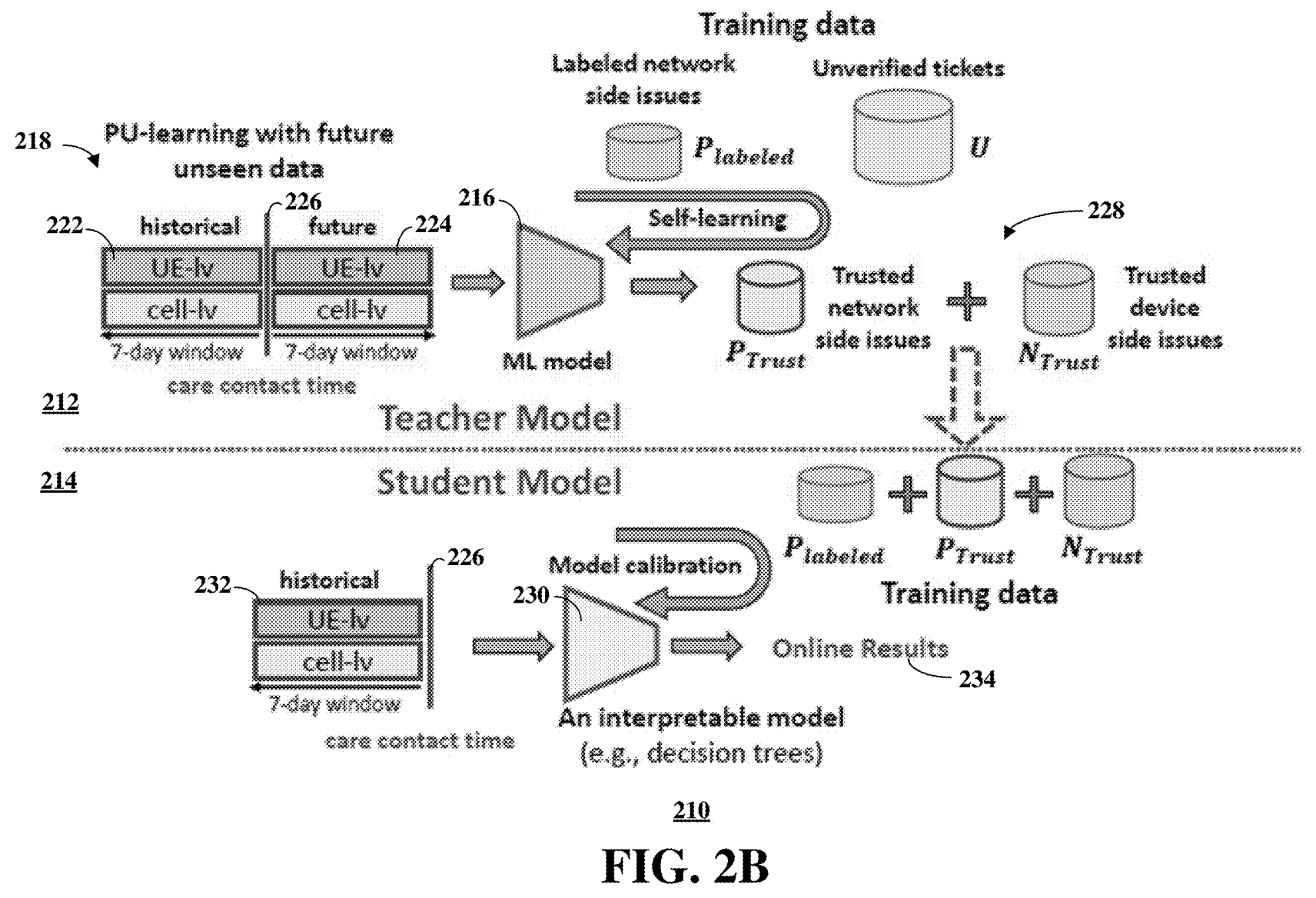

218
PU-learning with future unseen data
222
historical
UE-lv
cell-lv
7-day window
care contact time
226
future
224
UE-lv
cell-lv
7-day window
care contact time
216
ML model
Self-learning
Training data
Labeled network side issues
$P_{labeled}$
Unverified tickets
$U$
Trusted network side issues
$P_{Trust}$
228
Trusted device side issues
$N_{Trust}$
212
Teacher Model
214
Student Model
232
historical
UE-lv
cell-lv
7-day window
care contact time
226
230
Model calibration
An interpretable model (e.g., decision trees)
Online Results
234
$P_{labeled}$
$P_{Trust}$
$N_{Trust}$
Training data

CLOUD COMPUTING ENVIRONMENTS 375
VIRTUALIZED NETWORK FUNCTION CLOUD 325
VNE 330
VNE 332
VNE 334
TRANSPORT LAYER 350
BROADBAND ACCESS 110
VOICE ACCESS 130
WIRELESS ACCESS 120
MEDIA ACCESS 140
CONTENT SOURCES 175
300

600

MACHINE LEARNING-BASED CELLULAR SERVICE ISSUE TROUBLESHOOTING USING LIMITED GROUND TRUTH DATA

FIELD OF THE DISCLOSURE

The subject disclosure relates to system and method for troubleshooting cellular service issues using machine-learning solutions with limited ground truth data.

BACKGROUND

Troubleshooting cellular service issues at the per-User Equipment (UE) level is an essential task for cellular network providers. Service issues may arise from customers who are users of the cellular network but cannot make voice telephone calls or experience slow data rates, for example. The customer may make contact a customer care service of the of the provider to troubleshoot the problem. Cellular service providers use automatic troubleshooting systems which leverage machine learning-based solutions to aid customer care agents in identifying the root cause of a customer service issue, responding to users, and if necessary, forwarding the ticket to an expert team for offline analysis and resolution.

BRIEF DESCRIPTION OF THE DRAWINGS

Reference will now be made to the accompanying drawings, which are not necessarily drawn to scale, and wherein:

FIG. 2B is a block diagram illustrating an example, non-limiting embodiment of a teacher-student model training framework for a cellular network in accordance with some aspects described herein.

DETAILED DESCRIPTION

Figure 1:
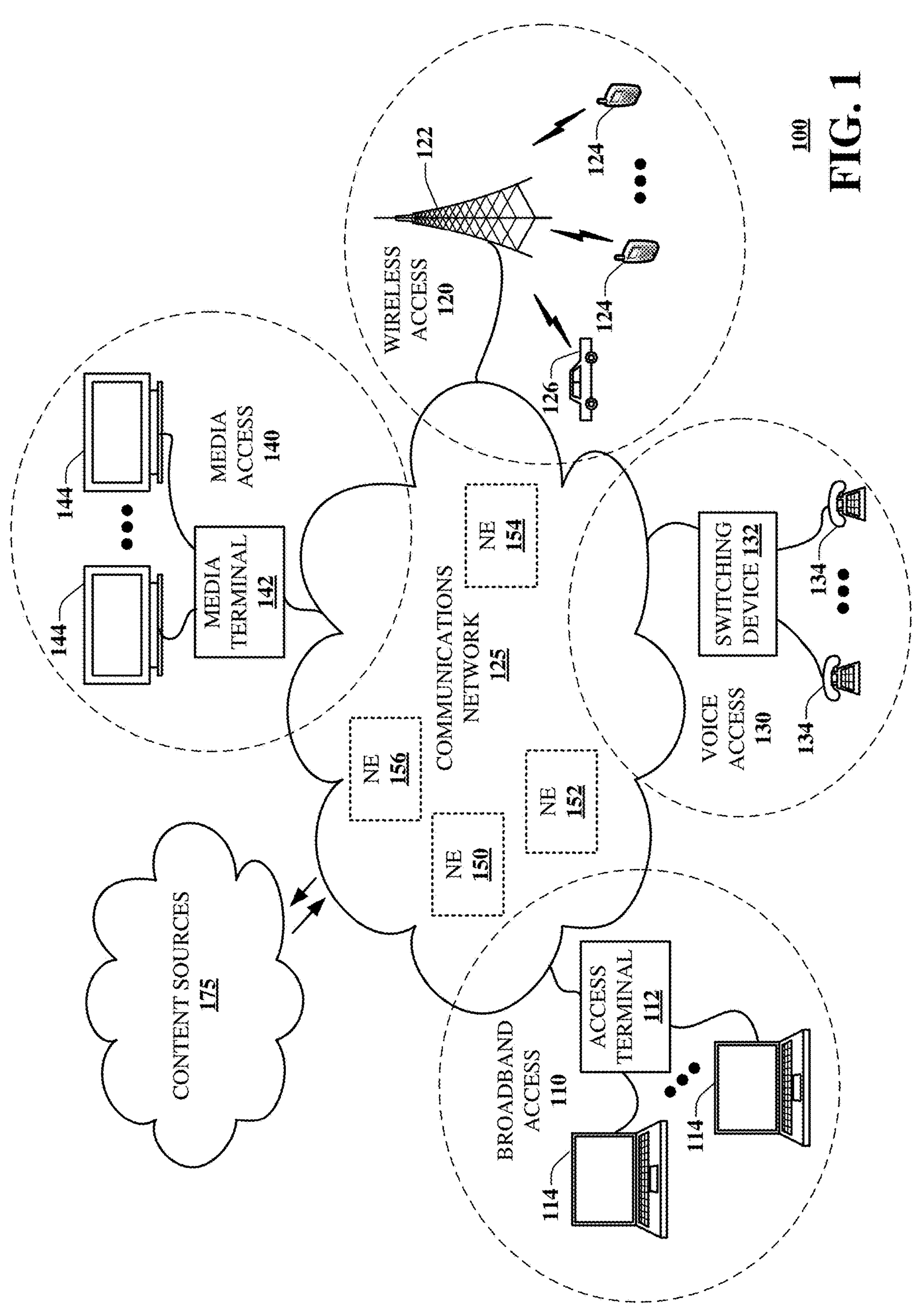
FIG. 1 is a block diagram illustrating an exemplary, non-limiting embodiment of a communications network in accordance with various aspects described herein.

The subject disclosure describes, among other things, illustrative embodiments for a method for extracting ground truth data from partially labeled or incorrectly labeled data in cellular service provider customer care. Since human-labeled data is often erroneous, methodologies described are used to enrich real-world training data. Other embodiments are described in the subject disclosure.

One or more aspects of the subject disclosure include training a teacher machine learning model based on a combination of labeled training data and unlabeled training data, the teacher machine learning model producing augmented training data, training a student machine learning model based on a combination of the labeled training data and the augmented training data, receiving, at a client, customer information about a service degradation at a user equipment (UE) device of a customer in a cellular network, providing the customer information to the student machine learning model, receiving, at the client, from the student machine learning model, information identifying a root cause of the service degradation, and modifying one of a network component of the cellular network and the UE device, based on the information identifying a root cause of the service degradation.

One or more aspects of the subject disclosure include receiving historical training data for a teacher-student model framework, the teacher-student model framework aiding a customer care agent to assist a customer of a cellular network to classify a source of a service degradation for the customer as one of a network error or a device error, the historical training data including previous service requests, the previous service requests including a subset of labeled previous service requests forming ground truth data for a first machine learning model or a teacher machine learning model; receiving future training data, the future training data based on previous care calls from previous customers in which a previous care agent acted to correct a previous service degradation, and information about a change in network performance due to action by the previous care agent; supplementing, in the teacher machine learning model, the historical training data with the future training data, forming supplemental training data to overcome a problem of limited ground truth data for the cellular network; training a second machine learning model or student machine learning model based on the supplemental training data. Aspects of the subject disclosure further include receiving a current customer care call identifying a current service degradation for a current customer; providing, to the student machine learning model, information about the current service degradation; receiving, from the student machine learning model, information identifying a root cause of the current service degradation; and modifying a network component of the cellular network or a user equipment device based on the information identifying the root cause of the current service degradation.

One or more aspects of the subject disclosure include receiving ground truth data for a cellular network, the ground truth data limited to labeled network troubleshooting tickets for an offline troubleshooting phase in the cellular network, the labeled network troubleshooting tickets identifying a service degradation and a resolution based on a network failure, identifying future training data based on improvements to network performance in the cellular network following a care call request for assistance and action by a customer care agent to resolve the care call request for assistance, supplementing the ground truth data with the future training data, forming supplemented training data, training a student machine learning model based on the supplemented training data, and classifying a current service degradation based on information about the current service degradation provided to the student machine learning model, wherein the current service degradation is classified as one of a network issue or a non-network issue.

Referring now to FIG. 1, a block diagram is shown illustrating an example, non-limiting embodiment of a system 100 in accordance with various aspects described herein. For example, system 100 can facilitate in whole or in part improving classification accuracy of a machine learning troubleshooting framework for a communications system. A two-stage, teacher-student machine learning framework supplements limited ground truth data from the communications system with future training data based on resolution actions taken by a customer care agent during a care call combined with network or device data collected after the care call to infer accurate ground truth information. The received limited ground truth data and the inferred ground truth information can then be used to train the student machine learning model for classifying service degradation reports during customer care calls. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
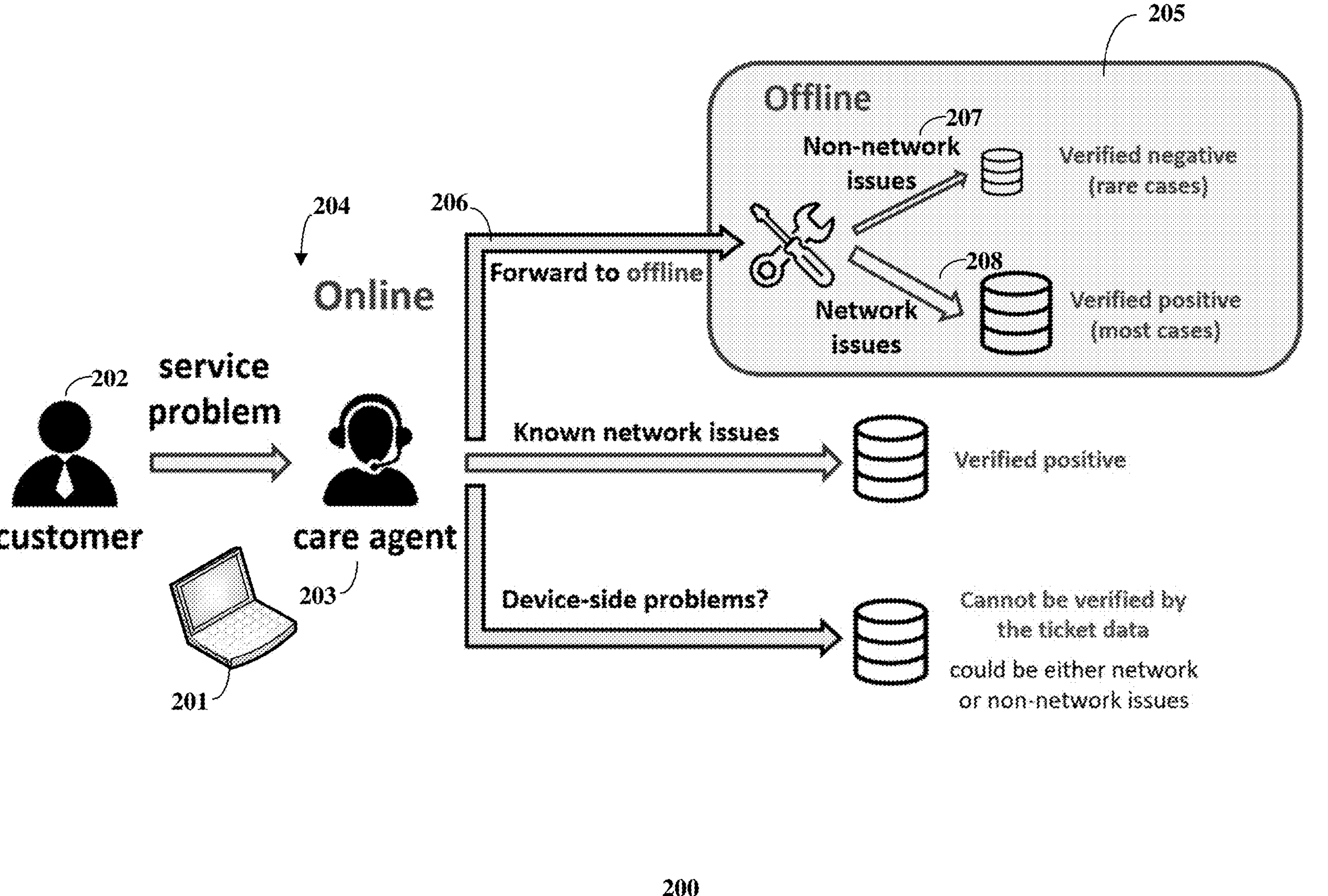
FIG. 2A is a block diagram illustrating an example, non-limiting embodiment of a troubleshooting and resolution process for a cellular network functioning within the communication network of FIG. 1 in accordance with various aspects described herein.

FIG. 2A is a block diagram illustrating an example, non-limiting embodiment of a prior art reactive troubleshooting and resolution process 200 for a cellular network. The troubleshooting and resolution process 200 enables detection and resolution of network problems or issues with reliable network in a cellular network or mobility network. The troubleshooting and resolution process 200 involves a customer 202 contacting a care agent 203 of the service provider. The troubleshooting and resolution process 200 generally involves an online phase 204 between the customer 202 and the care agent 203 and, in some instances, an offline phase 205.

An essential task of cellular carriers or mobility network providers is providing reliable and high-performance cellular services or mobility services for end-device users. Such end-device users employ smartphones and other user equipment (UE devices) to access voice and data services of the mobility network. To guarantee reliability and improve users' experience, the service provider puts substantial effort into resolving the service outages or performance degradation issues experienced by customers.

Identifying the root cause of such a service outage or performance degradation involves determining whether the service problem is caused by a network issue or a user-device specific error. When a cellular user or customer 202 contacts a customer care agent 203, the customer care agent 203 typically handles user issues through the two-phase resolution process 200 shown in FIG. 2A. In the online phase 204, the problem is primarily analyzed through live interaction between the customer 202 and a care agent 203. The care agent 203 may communicate with the customer 202 using any convenient medium such as a telephone call or a data session on a processing system such as personal computer 201. The personal computer 201 may provide access to network resources of the network operator with information about past and current network outages and information about the account of the customer 202 such as provisioned features. In practice, the issues experienced by the customer 202 may be attributed to a variety of reasons. These reasons may include network outages or maintenance, provisioning errors, mobile phone hardware or software failures, and external events. Some service providers use automatic troubleshooting systems which leverage machine learning (ML) based solutions to aid care agents such as care agent 203 in identifying the root cause, responding to the customer 202, and if necessary, forwarding the ticket to an expert tier-2 team for offline analysis and resolution in the offline phase 205.

Generally, the online phase 204 includes a conversation over a phone call between the customer 202 and the customer care agent 203. The customer care agent 203 can utilize existing automatic troubleshooting systems to get some insight into the problem and get systems support. The customer care agent 203 can then help the customer 202 to resolve the issue in order to reduce the handling delay and resolve as many issues as possible.

Many issues are case-specific, such as problems from the specific user equipment, provisioning issues, and some isolated or minor network problems that substantially impact the quality of the experience of the user or customer 202. In addition, even if a network issue has been made known to the service provider, the service provider also needs to respond to customers about those known issues and resolve customer concerns.

As noted, customer-reported issues are typically resolved in two phases including an online phase 204 or customer interaction phase and an offline phase 205 or ticket resolution phase. The online phase 204 is a troubleshooting process where the customer 202 engages directly with a care agent 203 and receives diagnosis and resolution immediately over phone calls or online chats. However, not every customer-reported issue can be resolved in the online phase 204. More complicated issues that cannot be resolved during the online phase 204 will then be sent to tier-2 support teams, such as a device support team and a network support team. The tier-2 support teams may be notified in the format of a customer trouble ticket 206. In the ticket resolution phase or offline phase 205, the ticket is routed to a tier-2 team based on the initial assessment of the possible root causes of the issue. The ticket resolution phase, or offline phase 205, is carried out by experienced tier-2 troubleshooting experts. The experts have access to a variety of network information and can access the network log data, perform data analysis, probe possible treatments, and correlate the current case with other reported issues nearby in the offline phase 205. It is possible that the initial assessment of the root cause of a ticket is not accurate, and the ticket can be routed through multiple teams before it is successfully resolved. Resolution of the ticket in the offline phase includes a conclusion that that issue was a network issue 207 or a non-network issue 208.

Both care agents such as care agent 203 and offline teams can accurately recognize a network-related problem by using information available in existing network troubleshooting systems, such as outage maps. Therefore, it is possible to verify, independently, using network observed data, labels of network-related issues. However, if a network-related problem is not detected, that is, if the issue is user-device specific or if it cannot be mapped to a known network outage or maintenance, then the labels assigned to these issues cannot be verified independently from network observed data. Such issues are resolved during an interactive troubleshooting session in the online phase 204 between the customer care agent 203 and the customer 202 in which the issue description provided by the customer 202 is used to identify the root cause. Since details of these interactive troubleshooting sessions are not logged owing to privacy concerns, system logs only capture a high-level summary of non-network-related issues.

As a result, the ground truth data acquired for ML models my include potential bias. Only a small fraction of overall tickets are identified and independently verified using network observed data as network related tickets. For the remaining tickets categorized as non-network-related tickets, there is not always sufficient information or evidence in the system logs to independently verify the correctness of the label assigned during the interactive troubleshooting in the online phase 204. Therefore, a customized machine learning model or learning method is required for automated cellular troubleshooting systems which can accurately distinguish network and user device issues based on the biased ground truth data.

In the present context, bias may refer to an unintentional skew or variation in an actual population from what would be expected or intended for the population, or a difference between expectation of a characteristic of a population on the one hand, and a true value of the characteristic of a population. Different types of potential biases may be introduced into data or models for machine learning. It should be understood that, because the systems and methods in this disclosure are meant to address potential outcomes address particular machine learning systems, any reference to bias means "potential bias" or an unintentional skew in data and is not a conclusion of bias in the common or legal sense of the word.

In accordance with various aspects described herein, a machine learning-based troubleshooting tool aims at helping customer care agents effectively distinguish if a customer reported service degradation is likely caused by a network related issue or by a device related issue in the customer interaction stage or the online phase 204. The ML-based troubleshooting tool is further aimed at helping tier-2 support teams to identify the cell sites that likely contribute to the service degradation if the service degradation is network related in the ticket resolution stage or offline phase 205. The machine learning based approach greatly reduces the manual investigation involved in the troubleshooting process, and hence reduces the resolution time. In addition, the automatic troubleshooting tool can extract interpretable insights about the network status and the decision-making process, which can assist the care agent 203 in manual inspection and issue resolution.

Several data sources are widely used or generated during the troubleshooting phases, including the online phase 204 and the offline phase 205. The data mainly includes historical customer care contact log and ticket details, and cell/UE-level network status such as cell site Key Performance Indicators (KPIs) and user session states. The cell-level KPIs used include the average number of Radio Resource Control (RRC) connections, which reflects the temporary user population, and the average utilization ratio of the Control Channel Elements, which reflects the congestion status. The data-driven automatic troubleshooting system is developed by learning from this data. All datasets are kept anonymous when being used for privacy reasons.

Particular data sources include Care Contact Log, which includes logs for the customer interaction phase. The log data is manually entered by the customer care agents. The data mainly include the care contact time, issue description and the recommended resolution provided by the agents, etc. Trouble Tickets include ticket data handled by the Tier-2 team in the offline phase 205. The ticket data generally includes the resolutions provided by experts for the hard cases that cannot be resolved during the online phase 204. Cell-level Network Log data includes real-time KPIs of the cell sites. The data is automatically collected at the eNodeB devices or gNodeB devices of the mobility network. The data includes the timestamp of the measures and the performance counter values. Further, UE-level Network Log includes cellular session log data for each UE device. The data is automatically collected at the core network gateways. It mainly includes user ID, timestamp of the session, duration, identification of the serving cell sites, and session status.

In accordance with various aspects described herein, a supervised machine learning model may be used to determine if an issue is due to a network issue or other than a network issue. Supervised machine learning is characterized by use of labelled datasets to train algorithms to classify data or predict outcomes accurately. As training data is provided to the model, the model adjusts weights until the model is sufficiently accurate. The target for training or validating the model with a labelled dataset may be known as the ground truth. The supervision for training the current ML model mainly comes from the online and offline manual troubleshooting tickets. However, the troubleshooting ticket ground truth could be noisy due to the following possible reasons.

First, the resolution provided by care agents such as care agent 203 cannot always be verified. The troubleshooting process may require intensive engagement of customers such as customer 202. When the care agent 203 proposes a possible solution in a remote troubleshooting scenario, the customer 202 needs to validate whether the solution can solve the problem. However, the customer 202 may not always be able to effectively validate the resolution or provide a confident validation result to the care agent 203. For example, if the customer 202 reports that network speed is slow, the problem may be mitigated after the care agent 203 performs some configuration changes, whereas the customer 202 may experience the issue again sometime later when the network becomes congested. Unfortunately, many customers may not choose to follow up with the case when the issue occurs again. Therefore, in the troubleshooting ticket data, care agents such as the care agent 203 only provide what resolution is used, while whether the resolution can completely solve the issue is unknown.

Second, the troubleshooting process may not be finished due to some unexpected reasons. An online troubleshooting process may take tens of minutes. However, not all customers can stay on the line until the problem is solved. Sometimes the care call line is accidentally dropped. This scenario is particularly common if the caller is currently experiencing some service issue. In those scenarios, the care agent cannot collect sufficient information to troubleshoot the problem effectively.

Third, not all troubleshooting results in the tickets can be trusted. Due to the limited information that is collected in the online phase, the care agent 203 may choose an incorrect direction to troubleshoot the issue. For example, the care agent 203 may not be aware of the propagation of some network issues and thus ignore the potential network problem.

Since the model-based troubleshooting framework is trained and evaluated based on the noisy ground truth troubleshooting data, a new concern arises. How responsible the model is when used in practice. To address this concern, two major questions are considered. First, how should the model be trained with partially trusted data? Second, how should the effectiveness of the model be verified given the limited ground truth data? A weakly-supervised learning framework is used to solve the noted problems.

The labels we used for the training dataset are from the manual troubleshooting tickets that are generated in the online customer interaction phases and the offline ticket resolution phases. Since the offline ticket resolution phase is carried out by the experienced tier-2 troubleshooting experts who can access the network log data, perform data analysis, probe the possible treatments, and correlate the case with other reported issues nearby in the offline, the troubleshooting phase can provide accurate issue identification labels.

On the other hand, due to the time constraints and the information constraints in the live phone call, not all resolution results in the online care log data are accurate. Specifically, only the care log tickets may be trusted where the agents specify that a known network problem can be identified, such as network outages or scheduled maintenance. For those issues, the care agents can find the associated cell site with an evident network failure using the current outage detection tools. However, for the remaining tickets, since the detailed troubleshooting process and customer's responses are not logged (for user privacy reasons), the correctness of the manual troubleshooting results cannot be verified based on the data.

Hence, a summary of the troubleshooting log data types based on the confidence of the proposed resolution in the tickets is shown in FIG. 2A. From the figure, only the offline troubleshooting tickets and the online network-issue-related tickets can be trusted. In addition, based on an observation of the offline troubleshooting tickets that were collected for one month, it is found that over 97% of the offline tickets were recognized as network issue related. This observation further demonstrates that the current manual troubleshooting framework can yield high precision for network issue detection, while the recall is unknown. Namely, based on the ticket data, the detected network issue cases can be considered as the correctly labeled tickets, while it is unknown how many network issue cases are not detected in the manual troubleshooting process.

According to the nature of the manual troubleshooting ticket data, we can formulate the automatic network issue detection task as follows. Let P be the universe of tickets where the root cause is a network side problem, and N be the universe of tickets where the root cause is not a network problem. After being classified by the manual troubleshooting process, P can be divided into two parts: $P_{labeled}$, which is the set of network issue related cases whose root cause can be identified through manual troubleshooting, and $P_{unlabeled}$, which is the remaining set, i.e., the network issue is not successfully found. In addition, we use N to represent the non-network-related tickets. The goal is training a ML model f that can distinguish between P and N. However, the training data can only give $P_{labeled}$. We call the rest of the unlabeled tickets in the training dataset U, where $U=P_{unlabeled}+N$.

The above learning problem is a PU-learning task, i.e., learning from positive and unlabeled data. A PU-learning problem, in contrast, is a case involving a training set in which just part of the data is labeled as positive while the rest is unlabeled and could be either positive or negative. Unlike binary classification problems, only partial supervision can be obtained from the ground truth data in PU-learning. Thus, to solve the PU-learning problem, one usually needs to train a binary classier using weakly-supervised learning strategies, which is more challenging than supervised learning. There are three major types of methods for solving the PU-learning problem: two-step techniques, biased learning, and class prior incorporation. Different techniques hold different assumptions regarding the training data distribution.

Two-step techniques assumes that all positive data samples (P) are similar to the labeled positive samples ($P_{labeled}$), while negative samples (N) hold a very different distribution. Thus, the key idea of two-step learning is first to find some trusted negative samples from the unlabeled data (U) based on the dissimilarity to the positive samples, and then to use semi-supervised learning methods to train the classifier using the labeled positive data and trusted negative data.

Biased learning is based on the selected completely at random (SCAR) assumption, namely, the labeled positive samples are selected completely at random for the positive data sample universe, i.e., $P_{labeled}$ and $P_{unlabeled}$ have identical distribution. In biased learning, all the unlabeled data U is considered as the negative class, while $P_{unlabeled}$ is considered as the noise in U. Then a classifier is trained based on this assumption, while the different weights are given for different training penalty sets. However, the SCAR assumption may not always be realistic. For example, in the troubleshooting ticket data, the positive class samples mainly come from the network outage cases that could be easily identified during the online phase and the complicated network issue cases that are resolved through offline troubleshooting. The experience and knowledge of the online care agents may affect which cases should be forwarded to ticket resolution in practice.

Class prior incorporation assumes the positive class prior, i.e., $|P|/(|P|+|N|)$, is known. Based on the class prior, a probabilistic classifier is trained using $P_{labeled}$ and the positive class and U as the negative class. Then the model is adjusted based on the output sample class probabilities such that the learned positive class frequency is similar to the class prior. The class prior can be decided by experiences or validation.

In embodiments, a combination of the above PU-learning approaches may be used to solve the problem. Side-channel knowledge from historical data may also be incorporated to help train the model in a weakly-supervised way.

FIG. 2B is a block diagram illustrating an example, non-limiting embodiment of a teacher-student model training framework 210 for a cellular network in accordance with some aspects described herein. The teacher-student model training framework 210 may be used to solve the PU-learning problem for the ML-model in reactive troubleshooting in cellular systems. The teacher-student model training framework 210 includes a teacher model 212 and a student model 214. The overall teacher-student model training framework 210 follows the two-step PU-learning framework, where the teacher model 212 is responsible for augmenting the training data set using advanced self-training strategies, while the student model 214 is used as a classifier that can answer user's queries in real-time.

The teacher model 212 includes a machine learning model 216. In embodiments, the teacher model 212 includes a deep neural network. The machine learning model 216 receives as input training data 218 and provides, as an output, training data 228 for the student model 214. The input training data 218 includes historical data 222 and future data 224. The historical data 222 include data collected at the UE level (UE-lv) and at the cell level (cell-lv) before the time 226 when the customer 202 contacts the care agent 203 for assistance. The future data 224 includes data collected at the UE level (UE-lv) and at the cell level (cell-lv) and is based on conclusions drawn by comparing network and device performance before the time 226 when the customer 202 contacts the care agent 203 for assistance and network and device performance after the time 226.

The student model 214 includes a machine learning model 230. The machine learning model 230 receives the training data 228 from the teacher model and receives as an input historical data 232. The input historical data 232 includes data gathered from a window of time, such as seven days, before the time 226 when the customer 202 contacts the care agent 203 for assistance. The input historical data 232 include UE device level (UE-lv) data and network level or cell level (cell-lv) data.

The care agent 203 is contacted by a customer 202 and can provide queries as an input to the student model 214. The care agent 203 receives output information 234 as an output from the student model 214. The student model 214 includes a machine learning model to help identify the root cause of a service issue when the customer 202 contacts the care agent 203. Any suitable machine learning model 230 may be used including a decision tree and a neural network. In one embodiment, the machine learning model 230 includes a convolutional neural network. The output information 234 may include an indication whether the problem identified by the customer 202 is likely a network problem or a non-network problem.

The machine learning model 230 is based on historical troubleshooting data which are manually labeled by the network operators or by the care agents such as care agent 203. However, that data is very limited. There is no good way to verify the correctness of the troubleshooting resolution result. However, if the true cause of the issue is not network related or the case is not correctly correlated to known network problems in the manual troubleshooting phase, it is hard to learn the real ground truth for those cases from the available data, namely, the manual labels for those samples are ambiguous or noisy. The machine learning model 230 is a classifier and training this classifier requites both positive data and negative data for training. Positive data indicates that the issue is from the network side and negative data indicates that the issue is from the device side. In this example, though, data are not fully available due to the nature of troubleshooting process. This forms a technical problem to be solved by the teacher-student model training framework 210 of FIG. 2B.

As noted, the teacher-student model training framework 210 is for use as an online system for reactive troubleshooting. When the customer 202 contacts customer care, the student model phase of the teacher-student model training framework 210 should give a resolution result. That means that the online phase 204 can only use historical data 232 collected before time 226 when the customer 202 contacted customer care. That is the input feature for the model. However, in the teacher model 212, where there is limited ground truth data, the model can use all available data. Available data includes not only the historical data but also future data after the customer 202 contacts customer care. By combining the historical data and the future data, it can be inferred, after the care agent 203 takes action to resolve the issue, whether the performance of the user device or of the network can be improved or can be changed.

In actual application scenarios, an ML-based cellular service troubleshooting tool should provide root cause classification results during the customer interaction phase or online phase 204. This means that information about the network performance and UE-level symptoms should be obtained from the historical data 222 before the user or customer 202 contacts the customer care agent 203. On the other hand, in the offline training phase (the teacher model phase), the historical data 222 may be compared with other data from a time after the user or customer 202 contacts the customer care agent.

Historical data 222 for this comparison may include any suitable information available in the network. Such information may include, for example key performance indicator (KPI) information about network operates. KPI information may be available at the level of individual cells in the cellular system, or at the individual eNodeB level. Such KPI information for UE devices may include, for example, information about data throughput at particular locations in the cellular network or for individual UE devices; error rates or dropped call rates at particular locations or for particular devices. Such KPI information for eNodeB devices may include numbers of UE devices handing off from one cell site to another. The information about the network performance can also include information about outages on the network side that causes the customer or UE device to receive no signal at the UE device. The information about the network performance can also include the widest variety of information about network components and user equipment interacting with the network components. The information about the network performance can be collected and stored over time and processed in any suitable manner. For example, the KPI information may be processes as KPI time-series data to show how a particular KPI value varies over time.

The information about the network performance can be used to define "future" network log data, future data 224. This future data 224 may be used in conjunction with historical data 222 to train the teacher model 212. In an example, a care call was received on August 8 requesting customer assistance for a customer having a service issue with their UE device. When a customer calls in to care, the system only uses the student model phase, historical data 222 for troubleshooting. The student model will give the final decision based on the available historical feature data. This is the online phase for model inference.

In the offline training phase, the teacher model is only used for label augmentation, in order to support the training of the student model. This stage happens before the student model is deployed for real time usage. The teacher model can use both historical and future feature data for analysis and learning. But the data is not for the new care calls from particular customers. The data was collected based on the past care call logs collected over a long period of history.

In the example of the customer care call received on August 8, historical data 232 from the seven-day time window of August 1 to August 7 is available for the online phase 204 for use by the student model 214. This same historical data from August 1 to August 7 is available as historical data 222 for the offline phase 205 for training the teacher model 212. Further, future data 224 is available for the seven-day time window from August 8 to August 15. This future data 224 is available for historical records stored in a database of the network provider and accessible to the teacher model 212.

The future data 224 and the historical data 222 may be used for comparison to determine a network problem or device problem and a resolution thereof. For example, the future data 224 and the historical data 222 may include KPI data for devices and network components. During the offline phase 205, the KPI data can be examined to reveal, for example, that the customer 202 did not have good throughput at the customer's device prior to the time 226 of the care call. If the KPI data for the same customer from a time right after the care call indicates that the customer did have good throughput, a conclusion may be drawn that the customer care agent 203 was able to take action to solve the problem for the customer 202 during the online phase 204. Even though a resolution of the call was not recorded during the online phase 204, the analysis during the offline phase 205 of log data allows an inference that a resolution was achieved.

The "future" network log data that is generated after a care contact can also include rich information to support the classification. In particular, by comparing the network performance or states before and after the care contact on both the cell-level and UE-level, it can be inferred (1) when the network problem (if any) begins and ends, (2) whether the UE-side performance is improved or the symptom disappears after the care agents handle the issue, and (3) whether the correlation between the UE-level performance states and the cell-level network states has been changed after manual troubleshooting.

Thus, the comparison between the data observations before and after the care contact can provide an idea of whether the troubleshooting actions executed by the care agents effectively solve the issue. If the UE-level performance shows improvement immediately after the care contact, it may be concluded that the issue is more likely a device-side or configuration problem. On the contrary, if the UE-level performance does not get improved immediately after the care contact but is correlated with the changes of cell-level network status, the issue is more likely a network side problem. In summary, although the effectiveness of most troubleshooting actions cannot be verified based on the ticket data, the historical and future network log data could be utilized to infer the effectiveness. The "future" network log data that cannot be obtained during the real-time troubleshooting phases can be used as side-channel supervision for training the PU-learning models.

Therefore, one solution to inferring the ground truth, that is identifying network-related issues in $P_{unlabeled}$, is to use network performance information after the care call, together with the knowledge of care agent actions, to label data. Unlike conventional ML-based troubleshooting systems which are limited by the features generated in a historical window before the user or customer 202 contacts the customer care agent 203, embodiments in accordance with various features described herein leverage "future" features (features that are generated after a care call) as a side-channel to train ML models in conditions with biased ground truth data. More specifically, by comparing the network performance or states before and after the care contact, the embodiments could infer (i) when the network problem, if any, begins and ends, and (ii) if the performance of user-device improves, or the symptoms alleviate, after the care call.

The teacher model 212 in embodiments is a PU-learning classifier that is trained based on historical ticket data in the offline phase 205. One purpose of the teacher model 212 is to pre-classify the tickets and generate a trusted and automatically labeled dataset, training data 228, that includes both the positive and negative instances. This dataset is then used as the training data 228 for training the student model 214, which is used for real-time troubleshooting in practice. To obtain the dataset of training data 228, two primary techniques may be used in the teacher model design: (1) advanced self-training strategies and (2) feature profiling with side-channel supervision.

The student model 214 in embodiments may be a binary classifier. The student model 214 can also be considered as the second classifier that is trained using the trusted data samples, training data 228, generated by the teacher model 212 in the two-step PU-learning framework. Since the student model 214 is used for real-scenario troubleshooting, it can only use the historical network data, historical data 232 for learning. In addition, to be responsible for the real customers, the decision-making process of the student model 214 should be interpretable by human care agents. Thus, the human care agents such as care agent 203 can understand why the student model thinks the problem is a network-side issue or a device-side issue, explain the root causes to the customers, and perform further investigations regarding the key observations if necessary.

The machine learning model 216 of the teacher model 212 may be any suitable machine learning model such as a convolutional neural network (CNN) model. The feature profiling method for the teacher model is designed such that the machine learning model 216 can learn with the side-channel supervision from the future data 224. Specifically, the new feature profile includes the cell-level network state features that are learned by the cell-level model and the raw KPIs of the top 5 reference cell sites. In addition, the feature profile also includes the UE-level states from the UE-level network log data for the same period. The cell-level and UE-level feature profiles may be concatenated along the time channel so that the temporal correlation of the two-side features are preserved. Using this feature profiling method, the machine learning model 216 can learn to automatically compare the data before and after the care contact and use this knowledge as additional potential high-level features through training. In addition, the CNN feature map may also be augmented before the last fully connected layer with a collection of manual features based on the raw KPI data. The manual features include statistics and high-level observations from both the cell-level data and the UE-level data.

In the cell-level, for every KPI, the KPI values on each cell site may be treated as a time-series signal, and the following features may be computed based the KPI data for each site:

- The statistical features, such as average, standard deviation, maximum, and minimal values.
- The signal shape features, such as shape factor, impulse factor, crest factor.
- The signal-to-noise ratio (SNR).

Each of the above features may be computed for the overall seven-day historical and future time windows before and after the care contact time, and every 24-hour interval in the two large time windows. Meanwhile, in the UE-level, measure the occupation pattern of each type of the cellular sessions may be measured (classified based on the session termination codes) and compute the following features:

- The occupation ratio, i.e., the total time while the UE is with the corresponding session divided by the window size.
- The longest occupation time, i.e., the longest period of time while the UE is with the corresponding session in the time window.
- The number of intervals in which the user is not with the corresponding session.

In addition, the number of handoffs in the sessions may also be measured and the same time-series features may be computed for the handoff pattern. Similar to the cell-level manual features, the UE-level features are also computed for the overall seven-day windows and every 24-hour interval.

Those manual features are found closely related to the network side anomalies and device-side symptoms and can be used to explain which key observations are used for making a decision in a human-readable way. For the teacher model, the manual features may be extracted based on both the historical and future raw features, in order to profiling the differences of the KPI statistics in the two contrasting time windows.

Training the Teacher Model

A self-paced training strategy may be used to train the teacher model 212 in a weakly-supervised manner. Specifically, given the labeled positive tickets $P_{labeled}$ and the unlabeled tickets U, the goal of the teacher model learning is to generate a trusted positive ticket set $P_{labeled}+P_{trust}$ and a trusted negative ticket set $N_{trust}$ through PU-learning, where $P_{trust} \subseteq U$, and $N_{trust} \subseteq U$. There could be some instances that are hard to be classified with a high confidence using the given conditions, for example, the instances that are near to the decision boundary. Those instances may be termed as $U_{untrust}$, i.e., $U_{untrust}=U-P_{trust}-N_{trust}$. One key objective of learning is to find the subsets $P_{trust}$ and $N_{trust}$ from U, such that instances in $P_{trust}$ are similar to the instances in $P_{labeled}$, while instances in $N_{trust}$ have a completely different distribution. In the whole learning process, the $P_{trust}$ and $P_{trust}$ are initialized as empty and grow incrementally until the model gets converged.

The training process includes three stages: (1) the warm-up stage, (2) the PU-loss pretraining stage, and (3) the self-paced learning stage. Initially, $P_{trust}=\emptyset$, $N_{trust}=\emptyset$ and $U_{untrust}=U$. In the warm-up stage, we only consider $P_{labeled}$ as the whole positive data and all U as the negative class. The model is trained as a standard binary classifier.

The goal of the warm-up stage is to initialize the model weights so that the model can find the unlabeled samples that are most similar to the labeled class (i.e., those "false positives") and the samples that are most dissimilar to the labeled class (i.e., those "true negatives"). After a few rounds of training in the warm-up stage, the model switches to the PU-loss pretraining stage.

In the PU-loss pretraining stage, the model is trained using P labeled as the positive class and U as the negative class. The optimization goal is to minimize the unbiased PU-loss. A biased reweighting method may be used to prevent the model from too aggressively thinking all unlabeled data samples are negative in the training process and produces a reasonable PU-classifier. However, the reweighting method estimates the loss at the statistic level based on the SCAR assumption, while, as explained before, the SCAR assumption may not be realistic for the troubleshooting problem. Therefore, individual sample-level errors still need to be considered in the next self-paced learning stage.

One key idea of the self-paced learning stage is that in each training round, a subset of the unlabeled samples is selected as the "trusted" negative samples based on the current model output probabilities and add those samples to the trusted negative set $N_{trust}$. Similarly, augment $P_{trust}$ may also be augmented based on the sample probabilities. Then the model parameters may be updated again based on the new $N_{trust}$ and $P_{trust}$, $U_{untrust}$, and $P_{label}$. The process is repeated until the model converges.

Design of the Student Model

The student model 214 is the inference model used in the customer interaction stage or online phase 204. The function of the student model 214 is to predict the root cause of a reported service issue with short latency. Therefore, only historical network status data, historical data 232, can be used in the student model 214 for online inference. To incorporate the knowledge from the future data with additional supervision information, the student model may be trained using the raw labeled data $P_{labeled}$ as well as the augmented ground truth data $P_{trust}$ and $N_{trust}$ that are obtained by PU-learning with the teacher model.

In addition, as a model that intends to resolve real customers' concerns, the student model should provide insightful and interpretable troubleshooting logic to the customers and care agents. Motivated by previous research in model interpretability for networking systems, decision-tree-based models may be choses rather than the deep neural networks for the student model 214.

Specifically, manual statistical features and UE-level network measurement data may be used as the feature profiles for the student model 214. The purpose of using those features instead of the raw time-series data is that the care agents can understand how those features contribute to the model's decision-making process. Note that for the student model 214, only the historical seven-day window features can be used.

An online client may be implemented for root cause classification in the customer interaction phase. In one embodiment, the online client operates on a processing system such as personal computer 201 (FIG. 2A) accessible by care agent 203 during the care call. During this online phase 204, the care agent 203 can access the online client, for example using personal computer 201 or another network-connected device. The client may cooperate with a server-side function to assist in the troubleshooting process. The care agent 203 can provide any suitable information to the client, such as identification information for the customer 202.

In one embodiment, the client first retrieves the corresponding UE-level historical network log data, historical data 232 from a database. The data in the database may be prefetched to improve performance. The client then computes statistics of the user sessions associated with each of the cell sites the customer 202 accessed and finds the top k' cell sites that are most frequently used by the customer 202. Through analysis, it has been observed in typica embodiments that the top k'=5 cell sites can cover 91% of usages for customers on average and would be sufficient to locate the network problem that greatly impacts the experience of the customer 202. Based on the top k' cell sites, the troubleshooting client retrieves the learned network status of the corresponding cell sites from a network status database. Finally, the client computes the cell-level and UE-level feature profiles for the UE associated with the customer 202 and provides the feature profiles to the machine learning model 230 for inference. In one embodiment, the machine learning model 230 comprises an XGBoost model that can also output the key features and value thresholds in each step of the decision trees for the final decision. The explanation of those key features can enable the human care agents understand why the problem is more likely a network-side or device-side problem over the other one.

In other embodiments, the XGBoost model can be easily replaced by other fine-tuned models or interpretable models. For example, if the current manual troubleshooting framework is improved and more supervision knowledge can be obtained from the manual tickets, the teacher model 212 and the student model 214 can be trained with advanced ground truth knowledge and new data using PU-learning or standard supervised machine learning.

Figure 2C:
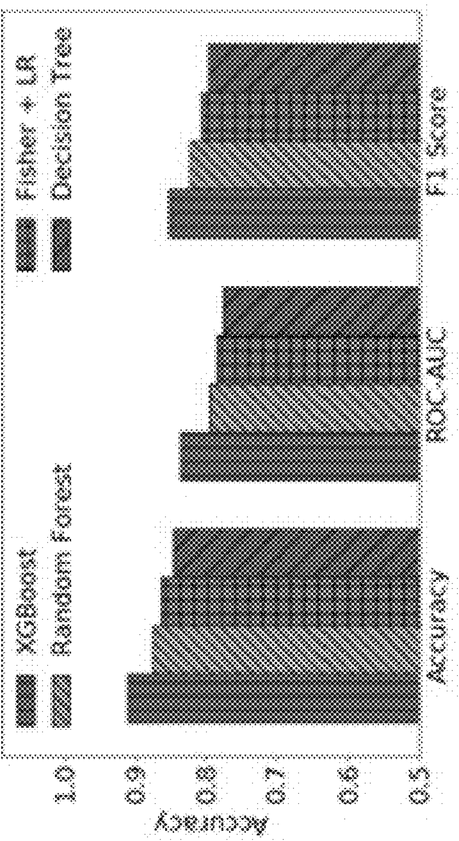
FIG. 2C depicts overall classification performance of the student model of FIG. 2B in accordance with various aspects described herein.

FIG. 2C depicts overall classification performance of the student model 214 of FIG. 2B in accordance with various aspects described herein. FIG. 2C shows accuracy for the labelled and trusted datasets used on four exemplary machine learning models. In the example, different interpretable classification models are compared for accuracy.

The student model 214 is trained to mimic the behavior of the teacher model using only the historical observations for the service issue cases. Specifically, the $N_{trust}$ is used as the negative class and $P_{trust}$+$P_{labeled}$ as the positive class when training and evaluating the student model 214. The performance, according to (RoC-AUC, Accuracy, and F1-score, of the different interpretable student models on the validation dataset are shown in FIG. 2C. ROC-AUC is receiver operating characteristic curve, area under the curve. Accuracy is a metric for classification models that measures the number of predictions that are correct as a percentage of the total number of predictions that are made. the F1 score is also an accuracy score but takes into account not only the number of prediction errors that a model makes, but that also look at the type of errors that are made. From the results, the XGBoost appears to outperform the other machine learning models because of its powerful capability of representing complex features.

Figure 2D:
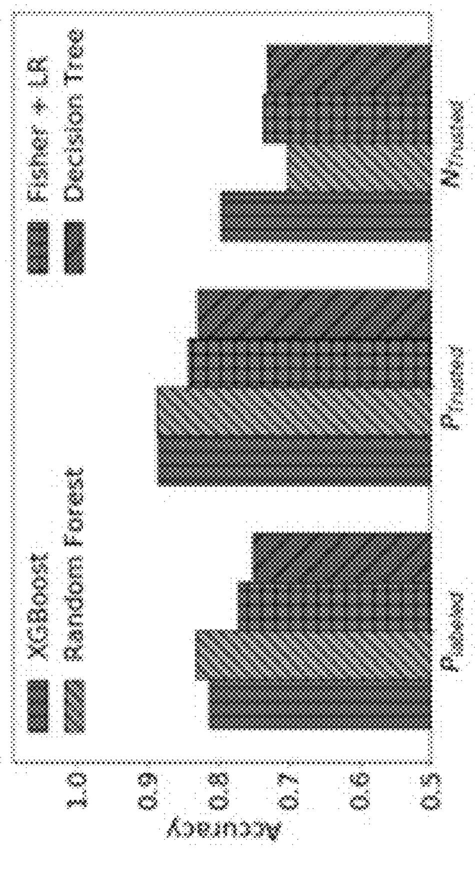
FIG. 2D depicts accuracy breakdowns for labelled and trusted samples of the student model of FIG. 2B in accordance with various aspects described herein.

FIG. 2D depicts accuracy breakdowns for labelled and trusted samples of the student model of FIG. 2B in accordance with various aspects described herein. The detailed accuracy breakdowns for $P_{labeled}$, $P_{trust}$, and $N_{trust}$ of the models on the validation dataset are shown in FIG. 2D. For the $P_{labeled}$ set, the XGBoost and Random Forest model can achieve more than 80% of recall, which is even higher than the LP-recall of the teacher model, which takes more knowledge for its input. One key reason is that the student model 214 can obtain more supervision knowledge from the training data (namely, the confident labels), which is provided by the teacher model 212. Besides, XGBoost can also achieve more than 80% accuracy on the other two groups with artificial labels, i.e., $P_{trust}$ and $N_{trust}$.

Figure 2E:
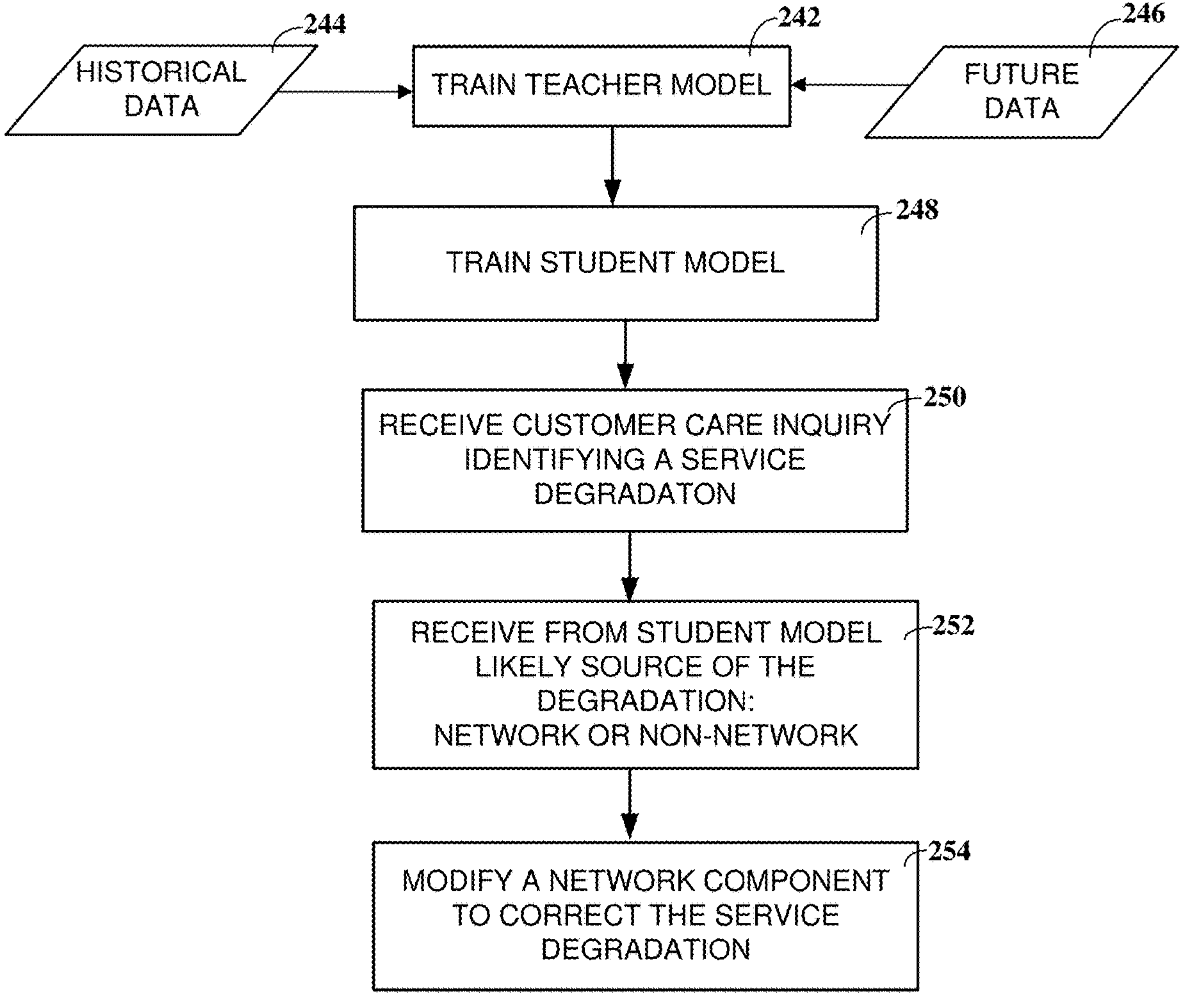
FIG. 2E depicts an illustrative embodiment of a method in accordance with various aspects described herein.

FIG. 2E depicts an illustrative embodiment of a method 240 in accordance with various aspects described herein. The method 240 may be used for as part of a troubleshooting process in a communications network such as a cellular network. The method 240 may be used to classify an issue identified by a customer as likely originating in the network, such as a network outage, or likely originating in a non-network source such as the customer's user equipment device or provisioning. The method 240 may be performed at any suitable network equipment of the cellular network such as a server computer or other device of a core network, a personal computer of a customer care agent, or other processing system.

To assist a customer care agent of the network operator in troubleshooting a customer's issue, a machine learning model-based troubleshooting framework may be used to aid the care agent in identifying a root cause of the service problem or other issue. In such a system, for training the machine learning model, obtaining large scale and comprehensive ground truth troubleshooting result data may be costly and require tremendous manual efforts from network operators. As a result, training such a machine learning model has been challenging. The model can easily overfit the limited available ground truth data. The method 240 operates as a two-stage learning framework to improve the classification accuracy of the machine learning-based troubleshooting framework At step 242, the method 240 includes training a teacher model of a teacher-student model. In embodiments, the teacher-student model forms a two-stage positive, unlabeled (PU) learning framework. The teacher model forms the first stage and operates to classify network issues into trusted positive and trusted negative instances. The training set for the teacher model includes labelled network issues. The root course of such labelled network issues has been reliably determined to be a network issue and the information about the issue has been labelled accordingly to form training data or supervision for the teacher model.

Further, the training data for teacher model is augmented with "future" observations. Accordingly, step 242 accesses historical data 244 including the labelled network positive and negative instances. The historical data 244 includes data about resolution actions taken by the care agent.

Further, step 242 accesses future data 246. The future data includes instances of service problems in which a resolution action has been taken after a care call from the customer to a care agent. Generally, for the future data 246, the service problem is not resolved by the care agent during an online phase or customer interaction phase and must be passed to network personnel for advanced review, identification and resolution. The resolution of the problem permits an inference of accurate ground truth data which then supplements the labelled data. The teacher model generates a trusted and automatically labelled training dataset with both positive and negative instances The output of the teacher model forms training data for the student model which may be considered the second stage of the two-stage model. A binary classification model may be used as the student model. The student model is used for real time troubleshooting in practice. The student model cooperates with input in real time from the care agent to provide a root cause identification of the source of the customer issue, either network or non-network. The student model is trained using the labelled data and the trusted data produced by the teacher model.

The teacher model and the student model may be trained offline as a background process and at a time prior to the remaining steps of method 240. Further steps of method 240 may use the student model, the teacher model or both during operation of the method 240.

At step 250, method 240 includes receiving a customer care inquiry from a customer. The customer care inquiry is directed to a customer care agent of the network operator such as in a phone call or online interaction. The customer care inquiry reports some service degradation experienced by the customer, such as no signal received at the customer user equipment device, dropped calls, etc. The customer care agent may interact with network equipment to identify a source of the service degradation. In particular, the customer care agent may provide to the student model information about, for example, the nature of the service degradation and identification of the customer. The student model operates to classify the root cause of the service degradation as being network related or non-network related.

At step 252, the method 240 receives from the student model information about the likely source of the degradation, either a network source or a non-network source. Network sources may include, for example, an outage at one or more components of the network due to maintenance or emergency, a component failure, etc. Non-network sources of the service degradation may include the user equipment device or the provisioning of the user account. For example, the user may be trying to use a service which has not been provisioned to his account. The information received at step 252 enables the care agent to narrow down the root cause of the problem and focus attention on resolution thereof.

At step 254, one or more network components is modified to correct the service degradation. The result received from the student model can be used to identify the root cause of the service degradation. The problem can then be solved in order to resolve the customer's issue. In an example, if a network component, such as an eNodeB serving the location of the customer, is experience service failure, the eNodeB can be repaired or replaced. Further, if the root cause of the problem is non-network, such as a mis-provisioned account of the customer, the network equipment storing the provisioning information may be accessed and correction made.

While for purposes of simplicity of explanation, the respective processes are shown and described as a series of blocks in FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
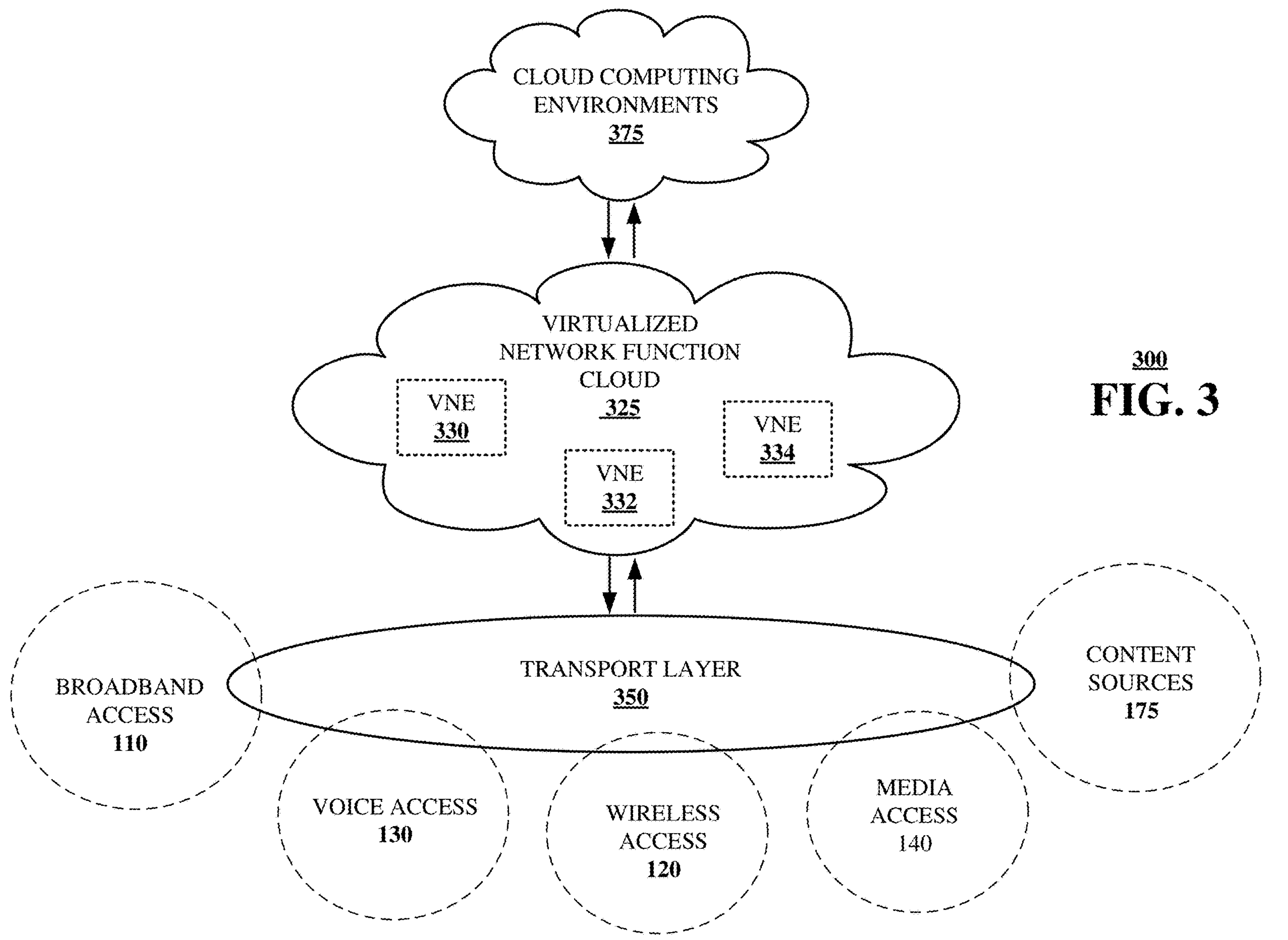
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of teacher-student model 210, and method 240 presented in FIG. 1, FIG. 2A, FIG. 2B, FIG. 2C, FIG. 2D, FIGS. 2E and 3. For example, virtualized communication network 300 can facilitate in whole or in part an improvement of classification accuracy of a machine learning troubleshooting framework for a communications system. A two-stage, teacher-student machine learning framework supplements limited ground truth data from the communications system with future training data based on resolution actions taken by a customer care agent during a care call combined with network or device data collected after the care call to infer accurate ground truth information. The received limited ground truth data and the inferred ground truth information can then be used to train the student machine learning model for classifying service degradation reports during customer care calls.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall, which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
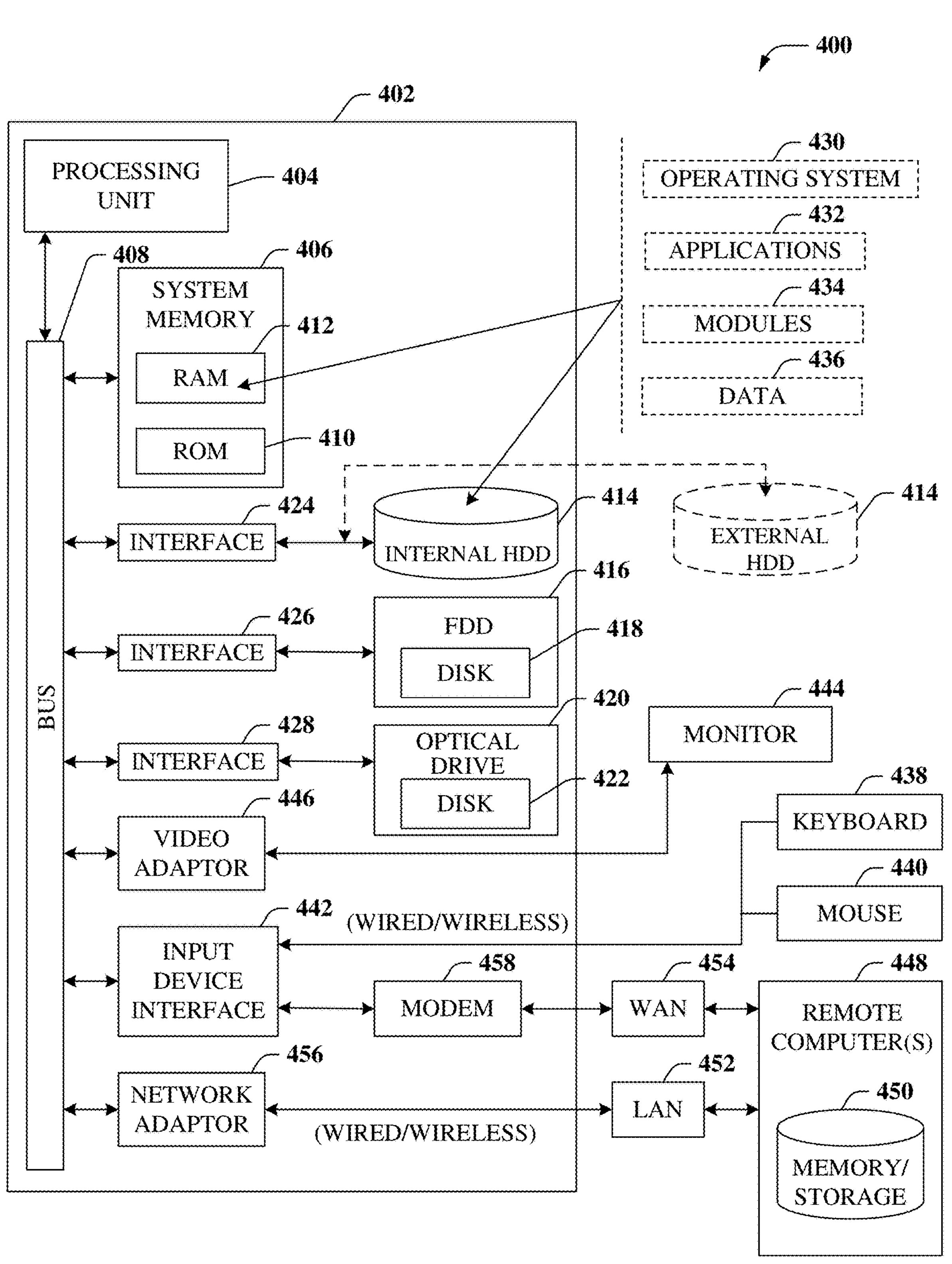
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part improving classification accuracy of a machine learning troubleshooting framework for a communications system. A two-stage, teacher-student machine learning framework supplements limited ground truth data from the communications system with future training data based on resolution actions taken by a customer care agent during a care call combined with network or device data collected after the care call to infer accurate ground truth information. The received limited ground truth data and the inferred ground truth information can then be used to train the student machine learning model for classifying service degradation reports during customer care calls.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
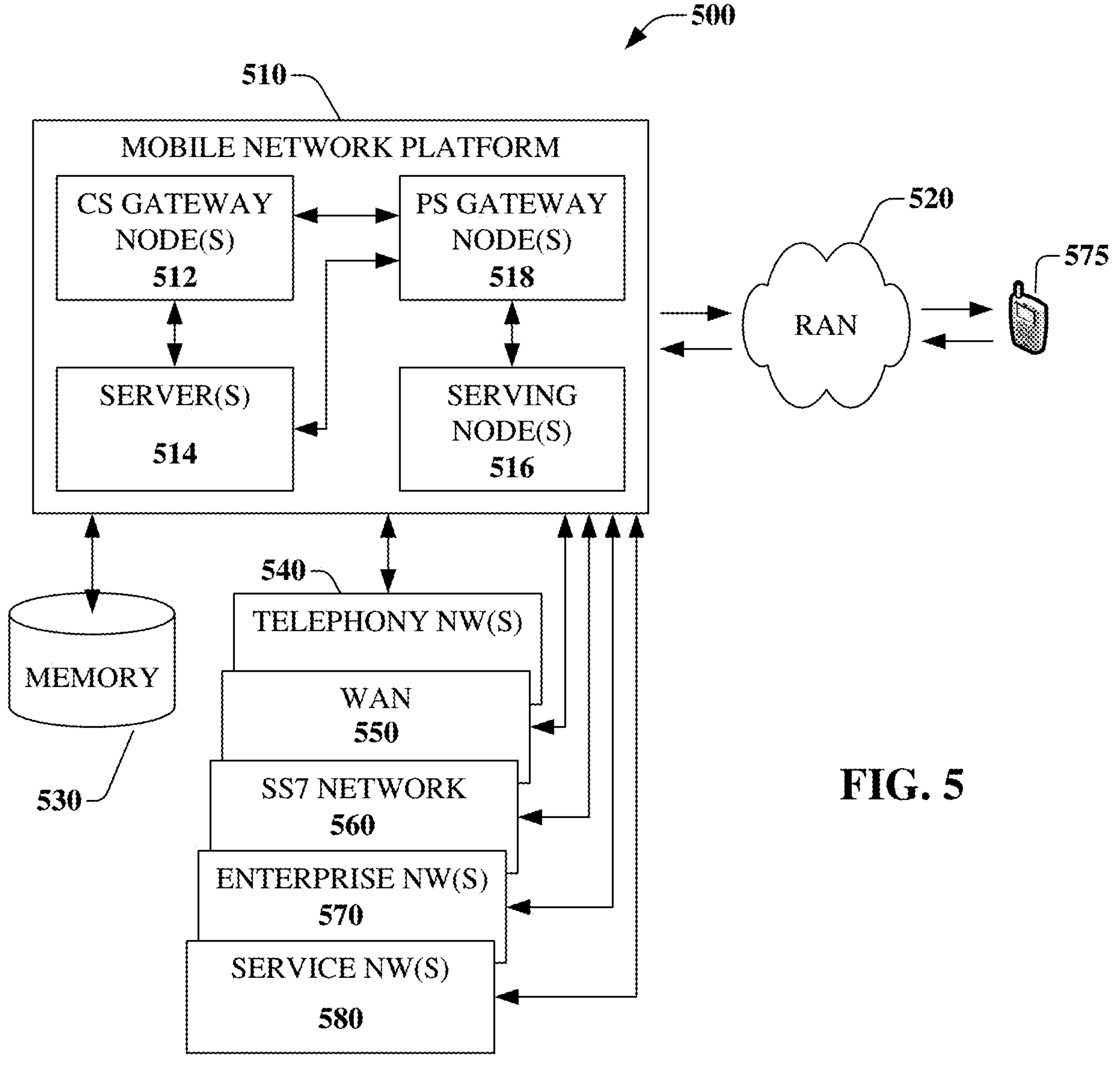
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part improving classification accuracy of a machine learning troubleshooting framework for a communications system. A two-stage, teacher-student machine learning framework supplements limited ground truth data from the communications system with future training data based on resolution actions taken by a customer care agent during a care call combined with network or device data collected after the care call to infer accurate ground truth information. The received limited ground truth data and the inferred ground truth information can then be used to train the student machine learning model for classifying service degradation reports during customer care calls. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
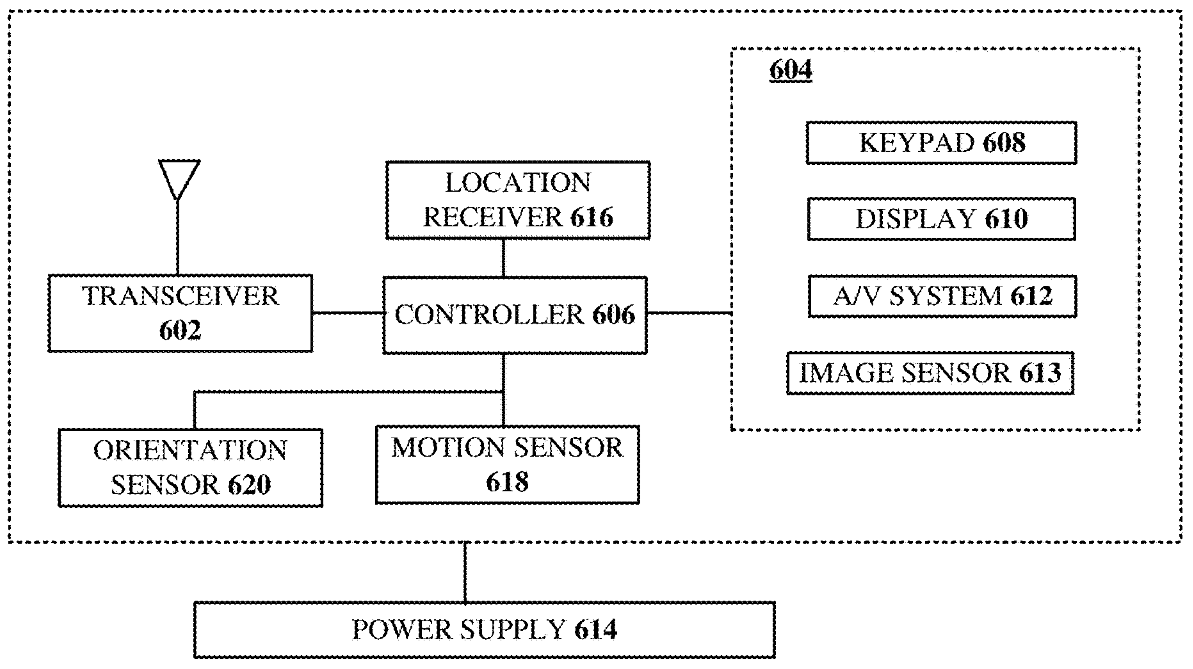
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part improving classification accuracy of a machine learning troubleshooting framework for a communications system. A two-stage, teacher-student machine learning framework supplements limited ground truth data from the communications system with future training data based on resolution actions taken by a customer care agent during a care call combined with network or device data collected after the care call to infer accurate ground truth information. The received limited ground truth data and the inferred ground truth information can then be used to train the student machine learning model for classifying service degradation reports during customer care calls.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

training a first machine learning model based on a combination of labeled training data and unlabeled training data, the first machine learning model producing augmented training data;

identifying future features, wherein each respective future feature of the future features corresponds to a resolution action taken in an offline phase to resolve a reported service degradation after an online phase corresponding to a past customer interaction, wherein identifying future features comprises:

comparing a previous network condition before a particular care call of a plurality of previous care calls with a subsequent network condition after the particular care call, in response to determining that UE-level performance improved substantially immediately after the particular care call, inferring that a root cause of the reported service degradation was a user device, and in response to determining that UE-level performance did not improve substantially immediately after the particular care call, inferring that the root cause of the reported service degradation was a network problem;

adding the future features to the augmented training data;

training a second machine learning model based on a combination of the labeled training data and the augmented training data;

receiving customer information about a current service degradation at a user equipment (UE) device of a customer in a cellular network;

providing the customer information to the second machine learning model;

receiving from the second machine learning model, information identifying a root cause of the current service degradation; and modifying a network component of the cellular network or the UE device, based on the information identifying a root cause of the current service degradation.

2. The device of claim 1, wherein identifying future features further comprises:

retrieving information about the plurality of previous care calls from customers, wherein the particular care call reports the reported service degradation at a customer UE device, and wherein the subsequent network condition occurs after troubleshooting actions are taken based on the particular care call; and inferring whether the troubleshooting actions corrected the reported service degradation.

3. The device of claim 2, wherein the operations further comprise:

identifying information about the particular care call in the unlabeled training data.

4. The device of claim 2, wherein identifying future features further comprises:

determining that a UE-performance improvement correlates with a change in a particular network component of the cellular network, wherein inferring that the root cause of the reported service degradation was a network problem is responsive to the determining that the UE-performance improvement correlates with the change in a particular network component.

5. The device of claim 2, wherein the operations further comprise:

inferring, based on the comparing the previous network condition with the subsequent network condition, a beginning time and an ending time for the reported service degradation.

6. The device of claim 2, wherein the operations further comprise:

inferring, based on the comparing the previous network condition with the subsequent network condition, whether performance of the customer UE device improves after the particular care call.

7. The device of claim 2, wherein the comparing the previous network condition with the subsequent network condition comprises:

comparing key performance indicators for a time period before the particular care call with the key performance indicators for a time period after the particular care call.

8. The device of claim 1, wherein the identifying future features comprises:

retrieving historical data for the cellular network;

identifying, in the historical data for the cellular network, one or more key performance indicators in the cellular network prior to the reported service degradation;

identifying, in the historical data for the cellular network, an improvement in the one or more key performance indicators during a time period subsequent to the reported service degradation; and adding information about the one or more key performance indicators to the future features.

9. The device of claim 1, wherein the first machine learning model comprises a teacher model used exclusively for facilitating the training the second machine learning model by providing the augmented training data for the second machine learning model in response to the adding the future features to the augmented training data, and wherein the second machine learning model comprises a student model.

10. The device of claim 1, wherein modifying the network component of the cellular network comprises repairing or replacing the network component.

11. A non-transitory, machine-readable medium, comprising executable instructions that, when executed by a processing system including a processor, facilitate performance of operations, the operations comprising:

training a first machine learning model based on a combination of labeled training data and unlabeled training data, the first machine learning model producing augmented training data;

retrieving information about a plurality of previous care calls from customers;

comparing a previous network condition before a particular care call of the plurality of previous care calls with a subsequent network condition after the particular care call, the particular care call reporting a service degradation at a customer UE device, resulting in a reported service degradation, the subsequent network condition occurring after troubleshooting actions are taken based on the particular care call;

in response to determining that UE-level performance improved substantially immediately after the troubleshooting actions, inferring that a root cause of the reported service degradation associated with the particular care call was a user device;

in response to determining that UE-level performance did not improve substantially immediately after the troubleshooting actions, inferring that the root cause of the reported service degradation associated with the particular care call was a network problem;

training a second machine learning model based on a combination of the labeled training data, the augmented training data, and the inferring of the root cause;

receiving customer information about a current service degradation at a user equipment (UE) device of a customer in a cellular network;

providing the customer information to the second machine learning model;

receiving from the second machine learning model, information identifying a root cause of the current service degradation; and modifying a network component of the cellular network or the UE device, based on the information identifying a root cause of the current service degradation.

12. The non-transitory, machine-readable medium of claim 11, wherein the operations further comprise:

determining that a UE-performance improvement correlates with a change in a particular network component of the cellular network, wherein inferring that the root cause of the reported service degradation was a network problem is responsive to the determining that the UE-performance improvement correlates with the change in a particular network component.

13. The non-transitory, machine-readable medium of claim 11, wherein the first machine learning model comprises a teacher model, and the second machine learning model comprises a student model.

14. The non-transitory, machine-readable medium of claim 11, wherein modifying the network component of the cellular network comprises repairing or replacing the network component.

15. A method, comprising:

training, by a processing system including a processor, a first machine learning model based on a combination of labeled training data and unlabeled training data, the first machine learning model producing augmented training data;

identifying, by the processing system, future features, wherein each respective future feature of the future features corresponds to a resolution action taken in an offline phase to resolve a reported service degradation after an online phase corresponding to a past customer interaction, wherein identifying future features comprises:

comparing a previous network condition before receiving the customer information with a subsequent network condition after receiving the customer information, in response to determining that UE-level performance improved substantially immediately after receiving the customer information, inferring that the root cause of the reported service degradation was a user device, and in response to determining that UE-level performance did not improve substantially immediately after receiving the customer information, inferring that the root cause of the reported service degradation was a network problem;

adding, by the processing system, the future features to the augmented training data;

training, by the processing system, a second machine learning model based on a combination of the labeled training data and the augmented training data;

receiving, by the processing system, customer information about a current service degradation at a user equipment (UE) device of a customer in a cellular network;

providing, by the processing system, the customer information to the second machine learning model;

receiving, by the processing system, from the second machine learning model, information identifying a root cause of the current service degradation; and modifying, by the processing system, a network component of the cellular network or the UE device, based on the information identifying the root cause of the current service degradation.

16. The method of claim 15, wherein identifying future features further comprises:

retrieving, by the processing system, information about the plurality of previous care calls from customers, wherein the particular care call reports the reported service degradation at a customer UE device, and wherein the subsequent network condition occurs after troubleshooting actions are taken based on the particular care call; and inferring, by the processing system, whether the troubleshooting actions corrected the reported service degradation.

17. The method of claim 16, further comprising:

identifying, by the processing system, information about the particular care call in the unlabeled training data.

18. The method of claim 16, wherein identifying future features further comprises:

determining, by the processing system, that a UE-performance improvement correlates with a change in a particular network component of the cellular network, wherein inferring, by the processing system, that the root cause of the reported service degradation was a network problem is responsive to the determining that the UE-performance improvement correlates with the change in a particular network component.

19. The method of claim 15, wherein the first machine learning model comprises a teacher model used exclusively for facilitating the training the second machine learning model by providing the augmented training data for the second machine learning model in response to the adding the future features to the augmented training data, and wherein the second machine learning model comprises a student model.

20. The method of claim 15, wherein modifying the network component of the cellular network comprises repairing or replacing the network component.

* * * * *